United States Patent
Zha et al.

(10) Patent No.: US 7,857,615 B2
(45) Date of Patent: Dec. 28, 2010

(54) INJECTION MOLD HAVING A BUFFER REGION

(75) Inventors: Xin-Xiang Zha, Shenzhen (CN); Jer-Haur Kuo, Taipei Hsien (TW)

(73) Assignees: Fu Zhun Precision Industry (Shen Zhen) Co., Ltd., Shenzhen, Guangdong Province (CN); Foxconn Technology Co., Ltd., Tucheng, Taipei County (TW)

( * ) Notice: Subject to any disclaimer, the term of this patent is extended or adjusted under 35 U.S.C. 154(b) by 0 days.

(21) Appl. No.: 12/494,332

(22) Filed: Jun. 30, 2009

(65) Prior Publication Data

US 2010/0173038 A1     Jul. 8, 2010

(30) Foreign Application Priority Data

Jan. 8, 2009     (CN) ................ 2009 1 0300119

(51) Int. Cl.
    *B29C 45/30*     (2006.01)
(52) U.S. Cl. ............... 425/572; 264/328.8; 264/328.12
(58) Field of Classification Search ............... 425/572, 425/588; 264/328.8, 328.12
See application file for complete search history.

(56) References Cited

U.S. PATENT DOCUMENTS

| | | | | |
|---|---|---|---|---|
| 5,518,389 | A * | 5/1996 | Nonomura et al. | 425/572 |
| 7,614,872 | B2 * | 11/2009 | Olaru et al. | 425/572 |
| 7,621,739 | B2 * | 11/2009 | Tilton et al. | 425/572 |
| 7,666,335 | B2 * | 2/2010 | Beaumont | 425/542 |
| 2004/0214371 | A1 * | 10/2004 | Mahmood | 438/106 |

* cited by examiner

*Primary Examiner*—Tim Heitbrink
(74) *Attorney, Agent, or Firm*—Frank R. Niranjan

(57) ABSTRACT

An injection mold has a plurality of cavities and a runner system for injecting material into the cavities. The runner system includes a main-runner and a sub-runner. The sub-runner interconnects the main-runner and the cavities. The sub-runner includes a first runner and a pair of second runners. The first runner connects the main-runner, and the second runners respectively connects ends of the first runner. A buffer rejoin is formed around a joint of the first runner and each second runner for mixing material when the material flows from the first runner into the second runners to make the material have a symmetric speed distribution in the second runners.

14 Claims, 4 Drawing Sheets

INJECTION MOLD HAVING A BUFFER REGION

BACKGROUND

1. Technical Field

The disclosure generally relates to injection molds, and particularly to a multi-cavity injection mold with an improved runner system.

2. Description of Related Art

In recent years, injection mold are widely used for manufacturing workpieces of various fields, such as cars, electric equipments, optical lenses, etc. Conventionally, an injection mold includes a plurality of cavities, and a runner system for injecting plastic into the cavities.

FIG. 4 is a schematic view of a runner system 14 of a conventional injection mold with four cavities 161, 162, 164, 165. The runner system 14 includes a main-runner 141 and three sub-runners 143, 145. The main-runner 141 and the sub-runners 143, 145 are coplanar, being horizontal. The sub-runners 143, 145 include a transverse runner 143 and a pair of longitudinal runners 145. The two longitudinal runners 145 are respectively connected to ends of the transverse runner 143. The main-runner 141 is connected to a middle of the transverse runner 143. The cavities 161, 162, 164, 165 are respectively connected to ends of the two longitudinal runners 145.

During molding, melted material 20, such as plastic, is injected into the main-runner 141, and then flows along the sub-runners 143, 145 to the cavities 161, 162, 164, 165 to form a plurality of workpieces simultaneously. However, when the melted material 20 flows to the sub-runners 143, 145, a temperature of a portion of the melted material 20 at a side of the sub-runners 143, 145 adjacent to the main-runner 141 is higher since the main-runner 141 is located close to a heat source and accordingly has a higher temperature. As it is well known that the viscosity of a fluid decreases as the temperature increases, a speed of the melted material 20 flowing in the sub-runners 143, 145 at the side adjacent to the main-runner 141 should be higher than the melted material 20 at a side away from the main-runner 141. Therefore, after a period of time, the amount of the material 20 flowing into the cavities 161, 162 is more than that into the cavities 164, 165. As a result, the workpieces formed by such an injection mold can not have a homogenous quality.

For the foregoing reasons, therefore, there is a need in the art for an injection mold with an improved runner system which overcomes the limitations described.

DETAILED DESCRIPTION

Figure 1:
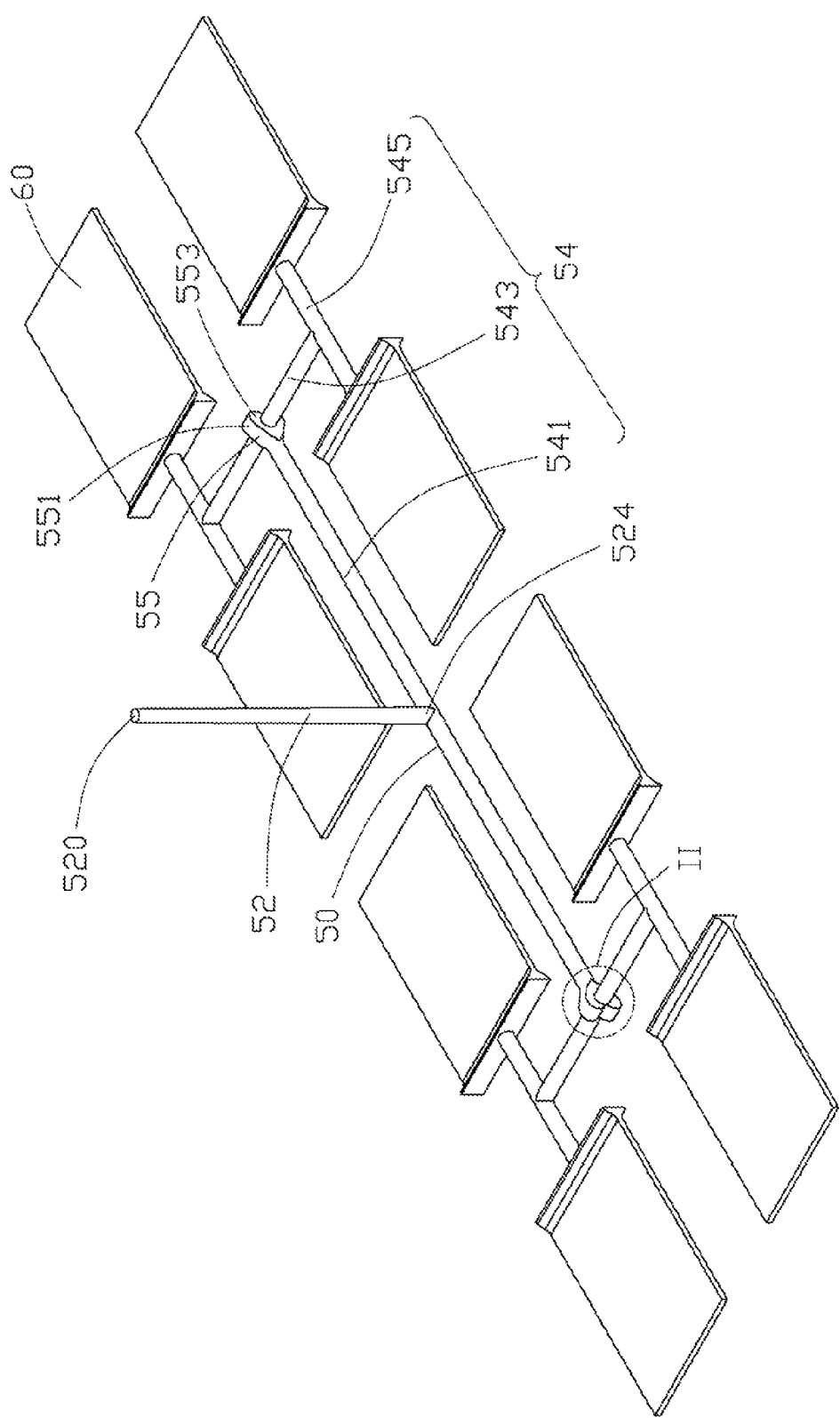
FIG. 1 is a schematic view of a runner system of an injection mold according to an exemplary embodiment.

Referring to FIG. 1, a runner system 50 of an injection mold according to an exemplary embodiment is shown. The runner system 50 is defined in the injection mold, and communicates cavities 60 of the injection mold for injecting plastic into the cavities 60 to form workpieces. In this embodiment, eight cavities 60 are shown, which means that the injection mold can form eight workpieces simultaneously. Apparently, the number of the cavities 60 is not limited to eight.

The runner system 50 includes a main-runner 52, and a sub-runner 54. The main-runner 52 is vertical, and defines an inlet 520 at a top end, and an outlet 524 at a bottom end thereof. The sub-runner 54 includes a first runner 541, two second runners 543, and four third runners 545. The first runner 541, the second runners 543 and the third runners 545 each are straight, and are horizontal. The first runner 541, the second runners 543 and the third runners 545 are at the same level, and cooperatively define a plane perpendicular to the main-runner 52.

The first runner 541 is connected to the outlet 524 of the main-runner 52 by a middle of the first runner 541. The two second runners 543 each are connected to an end of the first runner 541, in which the end of the first runner 541 is connected to a middle of a corresponding second runner 543. The two second runners 543 are parallel to each other, and are perpendicular to the first runner 541. Cooperatively the second runners 543 and the first runner 541 form an H-shaped profile. Each second runner 543 has two ends connected to middles of two third runners 545, respectively. The third runners 545 are perpendicular to the second runners 543, and are parallel to each other and to the first runner 541. Each second runner 543 and the two third runners 545 connected thereat form an H-shaped profile. The eight cavities 60 are respectively connected to ends of the third runners 545.

Figure 2:
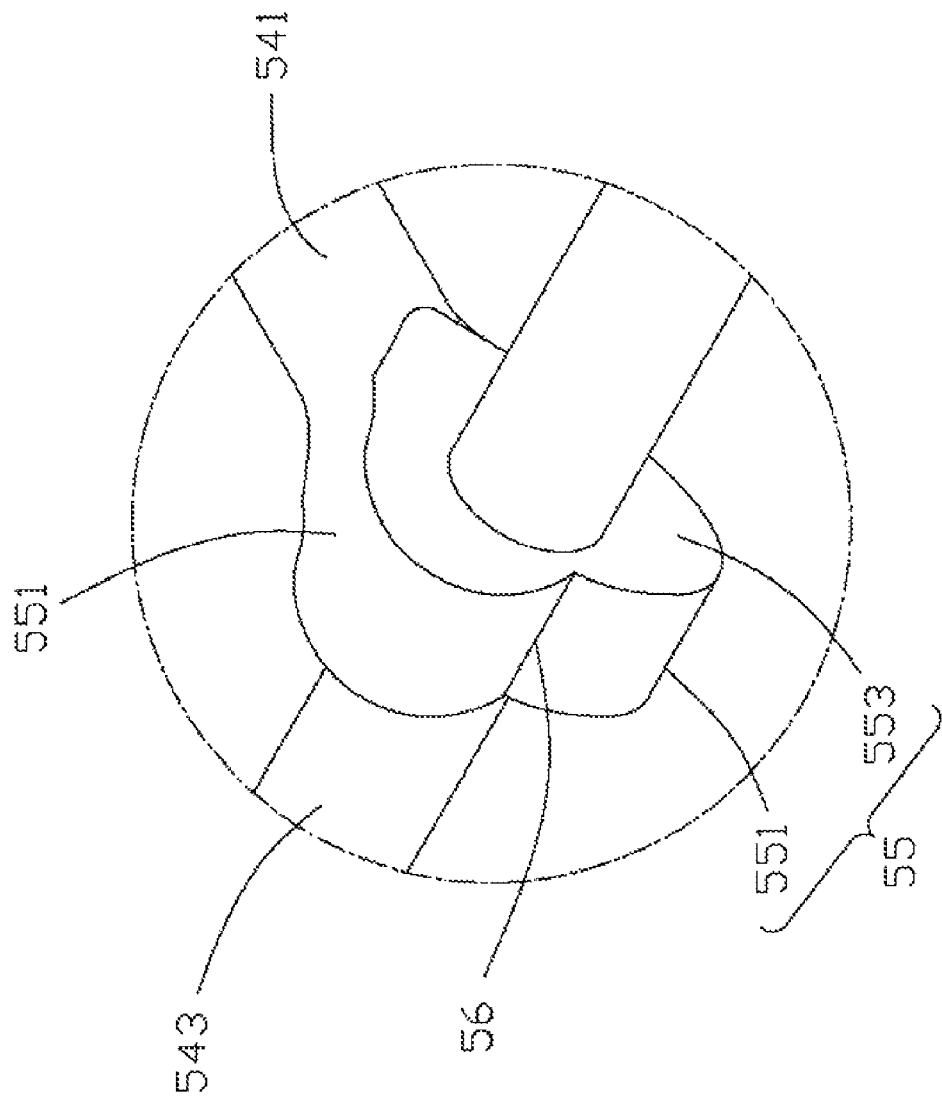
FIG. 2 is an enlarged view of a circle II of FIG. 1.

Referring to FIG. 2, a buffer region 55 is formed at a joint of the first runner 541 and each of the second runners 543. Each buffer region 55 has a heart-shaped profile, and is symmetric to a central axial of the first runner 541. The buffer regions 55 each include a pair of curved walls 551 and a pair of planar walls 553. The pair of planar walls 553 are vertical and perpendicular to and intersect with the corresponding second runner 543. The pair of curved walls 551 are respectively located around upper and lower sides of the second runner 543. Each curved wall 551 expands from the first runner 541, and then converges towards each other. The curved walls 551 intersect with each other at a side of the second runner 543 opposite to the first runner 541. A joint 56 of the curved walls 551 of each buffer region 55 is linear, and is parallel to and spaced a distance from the corresponding second runner 543.

During molding, melted material is injected into the main-runner 52 through the inlet 520, and then flows into the sub-runner 54 via the outlet 524. The viscosity, temperature and speed of the melted material in the first runner 541 of the sub-runner 54 each are not symmetrical to the central axis of the first runner 541. More specifically, the melted material at a top side of the first runner 541 has a temperature higher than that at a bottom side of the first runner 541, whilst has a speed at the top side larger than that at the bottom side of the first runner 541. The melted material at the top side of the first runner 541 has a viscosity lower than that at the bottom side. Since the buffer regions 55 are formed at joints of the first runner 541 and the second runners 543, the melted material flowing from the top and bottom sides of the first runner 541 is mixed together at each of the buffer regions 55 when the melted material flows from the first runner 541 to the second runners 543. The melted material after mixed in the buffer regions 55 thus can have a temperature distribution being substantially uniform. In other words, the melted material flows in each second runner 543 having a uniform temperature distribution. Finally, the melted material flows into each cavity 60 can have the same temperature distribution and the same speed distribution. Therefore, workpieces formed by the present injection mold are homogenous in texture.

Figure 3:
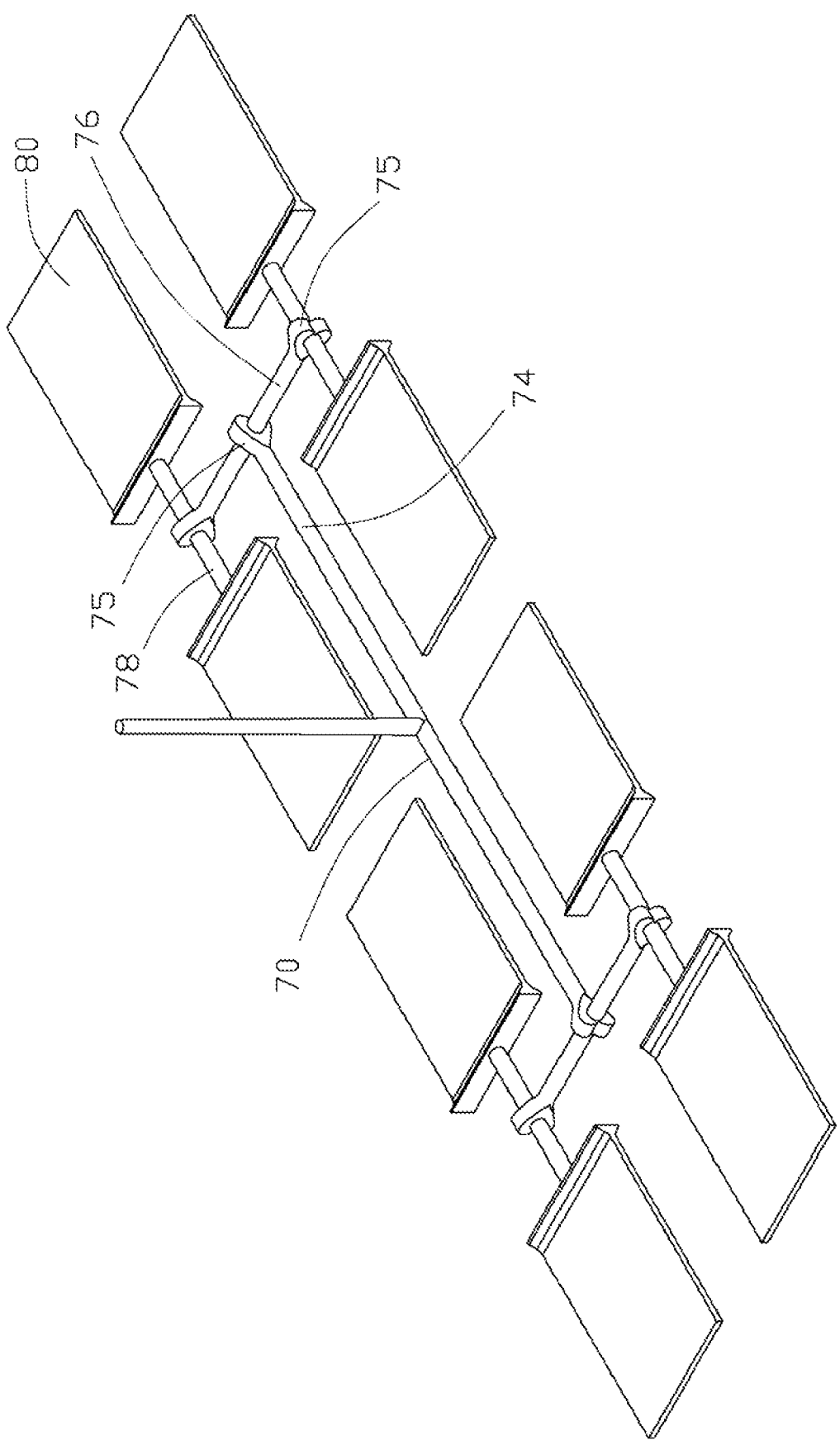
FIG. 3 is a schematic view of a runner system of an injection mold according to an alternative embodiment.
Figure 4:
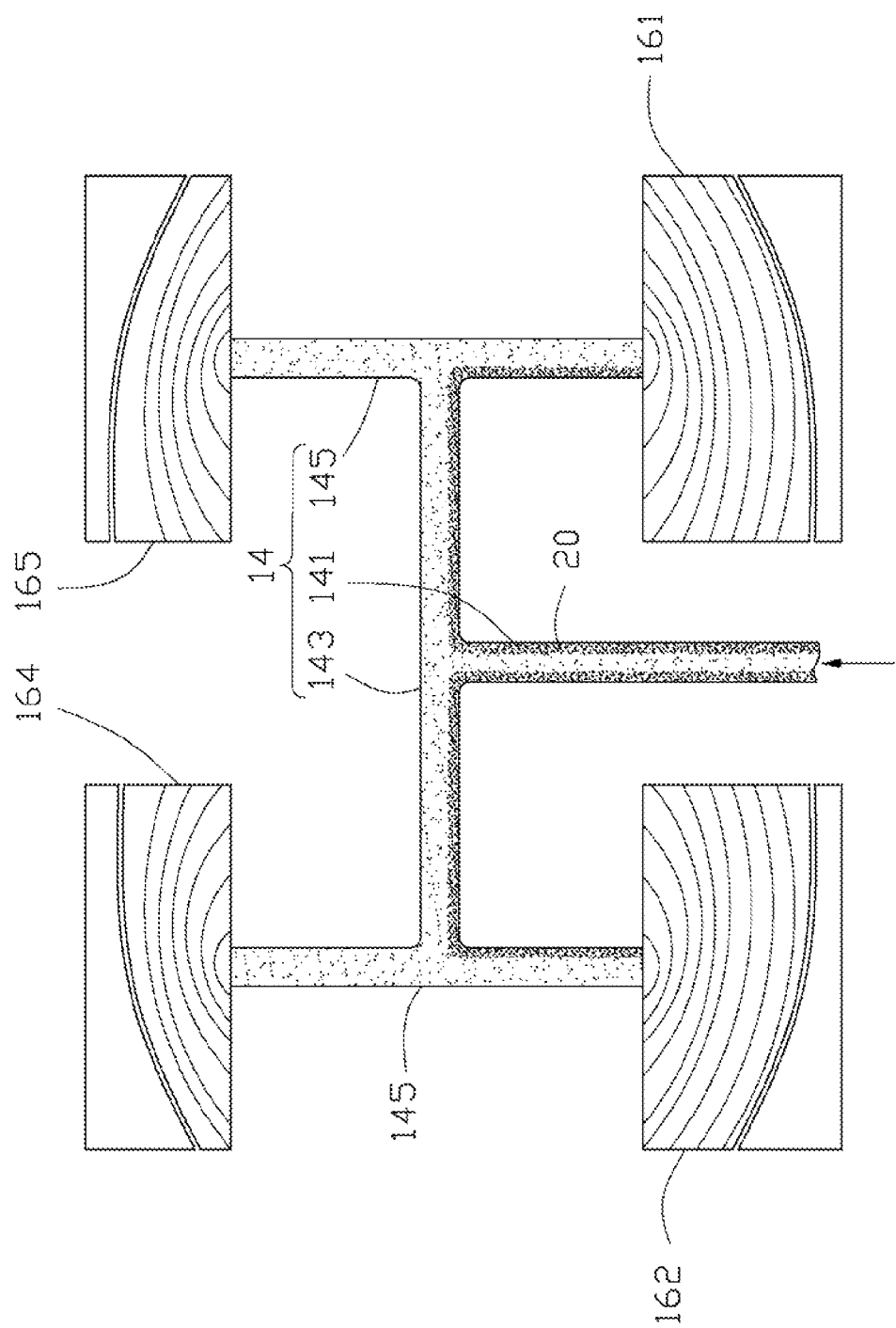
FIG. 4 is a schematic view of a runner system of a conventional injection mold.

FIG. 3 shows a runner system 70 of an injection mold according to an alternative embodiment. The difference between this embodiment and the previous embodiment is that a buffer region 75 is formed at each joint of the second runners 76 and the third runners 78. Therefore, the injection mold of this embodiment has six buffer regions 75, in which two buffer regions 75 are formed at joints of the first runner 74 and the second runners 76, and fours buffer regions 75 are formed at joints of the second runners 76 and the third runners 78. The six buffer regions 75 are the same as each other, each buffer region 75 being heart-shaped as that of the previous embodiment. Thus when the material flows along the runner system 70, the material can be mixed at the buffer regions 75 of the first runner 74 and the second runners 76, and then mixed at the buffer regions 75 of the second runners 76 and the third runners 78. The material flows to the cavities 80 thus having more evenly temperature distribution and speed distribution.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An injection mold comprising a plurality of cavities and a runner system for injecting material into the cavities, the runner system comprising a main-runner and a sub-runner, the sub-runner interconnecting the main-runner and the cavities, the sub-runner comprising a first runner and a pair of second runners, the first runner connecting the main-runner by a middle of the first runner, the second runners respectively connecting ends of the first runner, a buffer region being formed around a joint of the first runner and each second runner for mixing the material when the material flows from the first runner into the second runners to make the material have a symmetric speed distribution in each second runner regarding a central axis of each second runner.

2. The injection mold of claim 1, wherein the main-runner is vertical, and the sub-runner is horizontal.

3. The injection mold of claim 1, wherein each buffer region has a heart-shaped profile.

4. The injection mold of claim 3, wherein each buffer region comprises a pair of planar walls perpendicular to and intersecting with the second runner, and a pair of curved walls between the planar walls, each curved wall expanding from the first runner and then converging towards each other at a side of the second runner opposite to the first runner.

5. The injection mold of claim 4, wherein the curved walls form a linear joint spacing from and parallel to the second runner.

6. The injection mold of claim 1, wherein each second runner connects the first runner by a middle of each second runner, and the sub-runner further comprises four third runners respectively connected to ends of the two second runners.

7. The injection mold of claim 6, wherein each third runner connects each of the second runners by a middle of each second runner.

8. The injection mold of claim 7, wherein a buffer region is formed at a joint of each third runner and each of the second runners.

9. An injection mold comprising a runner system defined therein, the runner system comprising a main-runner and a sub-runner, the sub-runner comprising a plurality of runners connected together, a buffer region being formed at each joint of the runners of the sub-runner for mixing material flowing in the runner system at each joint to cause the material to have a symmetric speed distribution after flowing through the buffer rejoins.

10. The injection mold of claim 9, wherein the main-runner is vertical, and the sub-runner is horizontal.

11. The injection mold of claim 9, wherein each buffer region has a heart-shaped profile.

12. The injection mold of claim 11, wherein each buffer region comprises a pair of vertical planar walls, and a pair of curved walls between the planar walls.

13. The injection mold of claim 9, wherein the runners of the sub-runner comprises a first runner, and a pair of second runners connected to ends of the first runner by middles of second runners.

14. The injection mold of claim 13, wherein the runners of the sub-runner further comprising four third runners, each second runner connecting two third runners by ends of the second runner, each second runner and the two corresponding third runners forming an H-shaped profile.

* * * * *